US009488983B2

(12) United States Patent
Noh et al.

(10) Patent No.: US 9,488,983 B2
(45) Date of Patent: Nov. 8, 2016

(54) ROBOT CLEANER

(71) Applicant: LG ELECTRONICS INC., Seoul (KR)

(72) Inventors: Dongki Noh, Seoul (KR); Seungmin Baek, Seoul (KR); Taekyeong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/873,809

(22) Filed: Oct. 2, 2015

(65) Prior Publication Data
US 2016/0098039 A1    Apr. 7, 2016

(30) Foreign Application Priority Data
Oct. 2, 2014 (KR) .................. 10-2014-0133296

(51) Int. Cl.
| G05D 1/00 | (2006.01) |
| G01S 17/46 | (2006.01) |
| G01S 17/89 | (2006.01) |
| G01S 17/93 | (2006.01) |
(Continued)

(52) U.S. Cl.
CPC ........... *G05D 1/0088* (2013.01); *A47L 9/2826* (2013.01); *A47L 9/30* (2013.01); *G01S 7/491* (2013.01); *G01S 17/46* (2013.01); *G01S 17/89* (2013.01); *G01S 17/936* (2013.01); *G05D 1/0248* (2013.01); *G05D 1/0891* (2013.01); *A47L 2201/04* (2013.01)

(58) Field of Classification Search
CPC .................. G05D 1/0088; A47L 119/2826
See application file for complete search history.

(56) References Cited

U.S. PATENT DOCUMENTS

| 8,392,021 B2* | 3/2013 | Konandreas ....... A22C 17/0013 318/568.1 |
| 8,436,928 B2* | 5/2013 | Ise .......................... H04N 5/232 348/241 |
| 8,474,090 B2* | 7/2013 | Jones ........................ A47L 5/30 15/319 |

(Continued)

FOREIGN PATENT DOCUMENTS

| GB | 2 382 251 | 5/2003 |
| JP | 2005-236513 A | 9/2005 |

(Continued)

OTHER PUBLICATIONS

European Search Report dated Mar. 22, 2016 issued in Application No. 15188239.6.

(Continued)

*Primary Examiner* — Thomas Tarcza
*Assistant Examiner* — Alex C Dunn
(74) *Attorney, Agent, or Firm* — KED & Associates, LLP

(57) ABSTRACT

A robot cleaner may include a main body, a light irradiation unit irradiating light towards a region in front of the main body, an image sensor including a plurality of horizontal lines sequentially exposed to form an image, an image processing unit constructing frames by synchronizing signals output from the horizontal lines, such that, after construction of any one frame, the image processing unit does not construct one or more frames by ignoring signals output from the horizontal lines, and then constructs a next frame, and a controller controlling the light irradiation unit to irradiate light while the horizontal lines are exposed to construct the one frame, such that the light irradiation unit stops irradiation of light between before exposure of all the horizontal lines to construct the frame is completed and one point of time while the image processing unit ignores signals output from the horizontal lines.

17 Claims, 7 Drawing Sheets

(51) Int. Cl.
*G01S 7/491* (2006.01)
*G05D 1/02* (2006.01)
*A47L 9/28* (2006.01)
*A47L 9/30* (2006.01)
*G05D 1/08* (2006.01)

(56) References Cited

U.S. PATENT DOCUMENTS

| | | | |
|---|---|---|---|
| 8,515,578 B2* | 8/2013 | Chiappetta | G05D 1/0272 |
| | | | 180/167 |
| 9,137,453 B2* | 9/2015 | Tanaka | H04N 5/2354 |
| 9,298,183 B2* | 3/2016 | Artes | G05D 1/0022 |
| 2005/0178950 A1 | 8/2005 | Yoshida | |
| 2007/0263106 A1 | 11/2007 | Tanaka et al. | |
| 2007/0267570 A1 | 11/2007 | Park et al. | |
| 2010/0302364 A1 | 12/2010 | Kim et al. | |
| 2013/0103196 A1* | 4/2013 | Monceaux | A63F 9/183 |
| | | | 700/253 |
| 2013/0300849 A1* | 11/2013 | Ono | A61B 1/00006 |
| | | | 348/68 |
| 2014/0198249 A1* | 7/2014 | Tanaka | H04N 5/2354 |
| | | | 348/370 |
| 2014/0257563 A1* | 9/2014 | Park | A47L 9/009 |
| | | | 700/259 |
| 2014/0286644 A1* | 9/2014 | Oshima | H04B 10/11 |
| | | | 398/118 |
| 2014/0354803 A1* | 12/2014 | Chida | G01B 11/25 |
| | | | 348/136 |
| 2015/0188632 A1* | 7/2015 | Aoyama | H04B 10/116 |
| | | | 398/118 |

FOREIGN PATENT DOCUMENTS

| | | |
|---|---|---|
| JP | 2012-108184 A | 6/2012 |
| WO | WO 2013/094347 | 6/2013 |
| WO | WO 2014/033055 | 3/2014 |

OTHER PUBLICATIONS

Korean Notice of Allowance dated Sep. 18, 2015 issued in Application No. 10-2014-0133296.

* cited by examiner

ROBOT CLEANER

CROSS-REFERENCE TO RELATED APPLICATION

This application claims priority under 35 U.S.C. §119 to Korean Patent Application No. 10-2014-0133296, filed on Oct. 2, 2014 in the Korean Intellectual Property Office, whose entire disclosure is hereby incorporated by reference.

BACKGROUND

1. Field

The present disclosure relates to a robot cleaner.

2. Background

Robots have been developed for industrial use and take charge of a part of factory automation. Recently, as application fields of robots are further enlarged, medical robots and aerospace robots have been developed and robots used in homes have been developed. Among these robots, robots which may autonomously move are referred to as moving robots.

As a representative example of a moving robot used in home, there is a robot cleaner. The robot cleaner is a type of home appliance which sucks and removes dust or foreign substances while traveling about an area to be cleaned. The robot cleaner may autonomously travel using a rechargeable battery. The robot cleaner may include a light source to irradiate laser light of a designated pattern forwards and a camera to capture the image of an area in front of the robot cleaner. Obstacle conditions in front of the robot cleaner may be detected by analyzing a pattern displayed in the image captured by the camera.

In general, as a criterion to measure sensitivity of an imaging system, a signal to noise ratio (SNR) is used. In order to improve distinctiveness of the pattern displayed in the image, the SNR needs to be increased so as not to cause confusion with external light, etc. For this purpose, increase in output of laser light may be considered. However, laser light of high output may be harmful to human bodies, especially possible damage to the eyes, and hence, may be unsuitable.

Differently, decrease in noise of external light, etc. needs to be considered. For this purpose, a high-quality filter is required and, thus, manufacturing costs are increased and a difficulty in manufacturing process management is caused.

BRIEF DESCRIPTION OF THE DRAWINGS

The embodiments will be described in detail with reference to the following drawings in which like reference numerals refer to like elements wherein.

DETAILED DESCRIPTION

Figure 1:
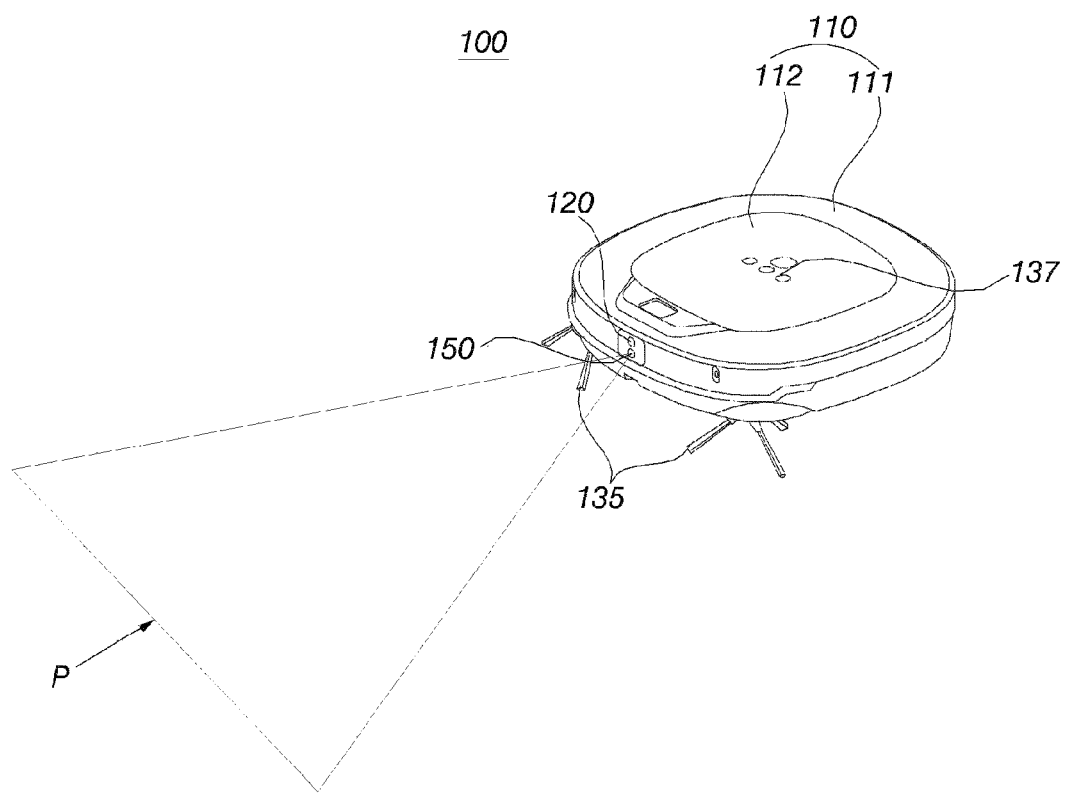
FIG. 1 is a perspective view of a robot cleaner in accordance with one embodiment of the present disclosure.
Figure 2:
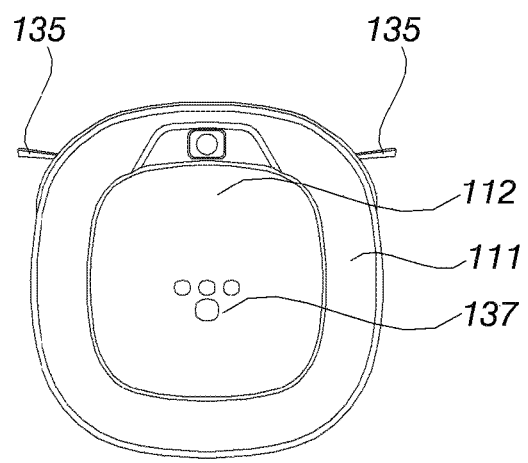
FIG. 2 is a view illustrating a top surface part of the robot cleaner shown in FIG. 1.
Figure 3:
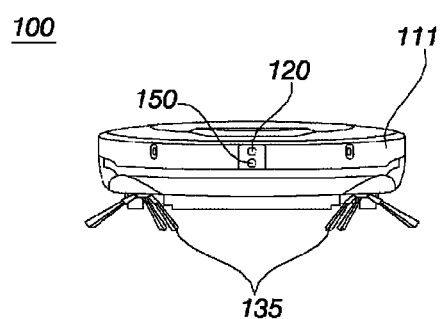
FIG. 3 is a view illustrating a front surface part of the robot cleaner shown in FIG. 1.
Figure 4:
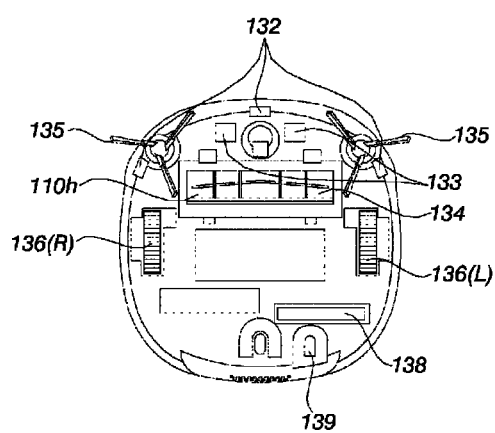
FIG. 4 is a view illustrating a bottom surface part of the robot cleaner shown in FIG. 1.
Figure 5:
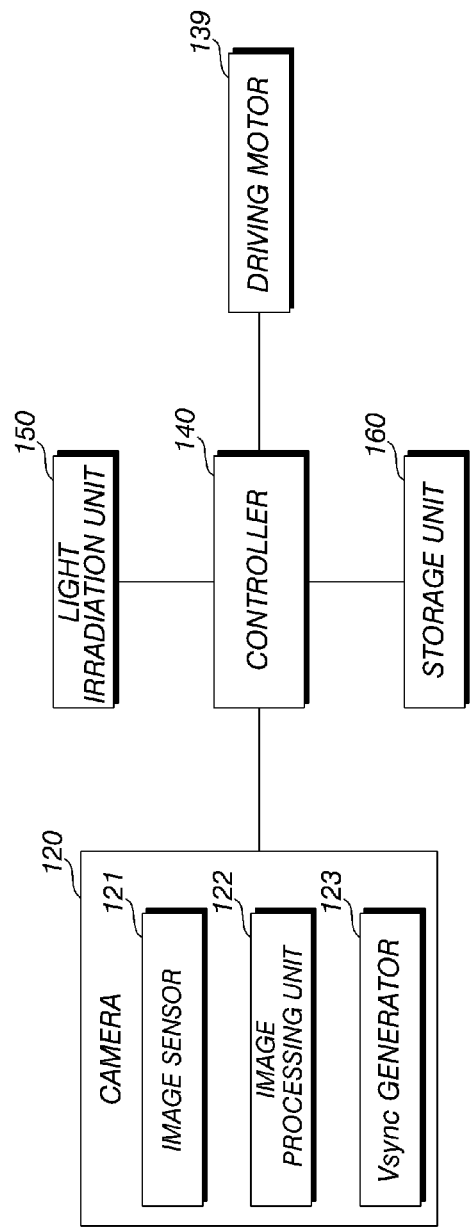
FIG. 5 is a block diagram illustrating control relations between main elements of the robot cleaner.

FIG. 1 is a perspective view of a robot cleaner in accordance with one embodiment of the present disclosure, FIG. 2 is a view illustrating a top surface part of the robot cleaner shown in FIG. 1, FIG. 3 is a view illustrating a front surface part of the robot cleaner shown in FIG. 1, FIG. 4 is a view illustrating a bottom surface part of the robot cleaner shown in FIG. 1, and FIG. 5 is a block diagram illustrating control modules for controlling main elements of the robot cleaner.

With reference to FIGS. 1 to 5, a robot cleaner 100 may include a main body 110 cleaning the floor within a cleaning area while autonomously traveling and an image acquisition unit or camera 120 acquiring an image around the main body 110. Hereinafter, for purpose of convenience, a part of the main body 110 facing the ceiling within the cleaning area will be defined as a top surface part (with reference to FIG. 2), a part of the main body 110 facing the floor within the cleaning area will be defined as a bottom surface part (with reference to FIG. 4), and a part forming the circumference of the main body 110 between the top surface part and the bottom surface part will be defined as a front surface part (with reference to FIG. 3).

At least one driving wheel 136 to move the main body 110 is provided and driven by a driving motor 139. Driving wheels 136 may be provided at the left and right sides of the main body 110. The driving wheels 136 provided at the left and right sides of the main body 110 will be referred to as a left wheel 136(L) and a right wheel 136(R).

The left wheel 136(L) and the right wheel 136(R) may be driven by one driving motor or, as needed, a left wheel driving motor to drive the left wheel 136(L) and a right wheel driving motor to drive the right wheel 136(R) may be provided. The traveling direction of the main body 110 may be changed to left and right by varying the rotational speeds of the left wheel 136(L) and the right wheel 136(R).

A suction hole 110*h* to suck air may be formed on the bottom surface part of the main body 110, and a suction device or a motor providing suction force to suck air through the suction hole 110*h* and a dust casing to collect dust sucked together with air through the suction hole 110*h* may be provided within the main body 110. The main body 110 may include a case 111 forming a space to receive various elements constituting the robot cleaner 100. An opening to insert and separate the dust casing into and from the main body 110 may be formed on the case 111, and a dust casing cover 112 to open and close the opening may be provided on the case 111 so as to be rotatable with respect to the case 111.

A roll-type main brush 134 having bristles exposed to the outside through the suction hole 110*h* and auxiliary brushes 135 located at the front region of the bottom surface part of the main body 110 and including bristles having a plurality of wings extended radially may be provided. Dust may be removed from the floor within the cleaning area by rotation of these brushes 134 and 135, and dust separated from the floor is sucked through the suction hole 110h and collected in the dust casing.

A battery 138 serves to supply power required for the overall operation of the robot cleaner 100 as well as the driving motor 139. When the battery 138 is discharged, the robot cleaner 100 may travel to return to a charging station of a remote place so as to recharge the battery 138. During such returning travel, the robot cleaner 100 may autonomously detect the position of the charging station.

A control panel 137 receives instructions to control operation of the robot cleaner 100 from a user. Various instructions, such as setting of a course, setting of a cleaning area, execution of recharging, etc., may be input through the control panel 137.

A light irradiation unit 150 irradiates light of a designated pattern (hereinafter, referred to as 'patterned light') to the inside of the cleaning area. The light irradiation unit or module 150 may include a light source and an optical pattern projection element (OPPE). The patterned light is generated by causing the OPPE to transmit light incident from the light source. The light source may be a laser diode (LD), a light emitting diode (LED), etc. Laser light has excellent monochromaticity, straightness, and connection properties, as compared to other light sources, and may thus execute fine distance measurement. Particularly, since infrared light or visible light has a high deviation in precision in distance measurement according to factors, such as colors and materials of a target object, the laser diode may be used as the light source.

The OPPE may include a lens, a mask, or a diffractive optical element (DOE). The light irradiation unit 150 may irradiate light towards the floor in front of the main body 110. Although this embodiment describes that patterned light of a horizontal line P is irradiated, as exemplarily shown in FIG. 1, light is not limited to such a pattern.

The camera 120 photographs an area to which patterned light is irradiated. The camera 120 may be a digital camera, which converts the image of a subject into an electrical signal, converts the electrical signal into a digital signal and then stores the digital signal in a memory device, and may include an image sensor 121 and an image processing unit 122.

The image sensor 121 converts an optical image into an electrical signal. The image sensor 121 is a chip in which a plurality of photodiodes is integrated. For example, the photodiodes may be pixels. When light having passed through the lens forms an image on the chip, charges are accumulated in the respective pixels constructing the image and the charges accumulated in the pixels are converted into an electrical signal (for example, voltage). As is well known, a charge coupled device (CCD), a complementary metal oxide semiconductor (CMOS), etc. may be used as the image sensor 121.

In order to control exposure of the pixels constituting the image sensor 121, a global shutter method and a rolling shutter method are used. In the global shutter method, all pixels constituting the image sensor 121 are simultaneously exposed and, thus, one frame constructing a still image or a moving picture may be immediately acquired. Generally, the global shutter method is applied to a CCD.

In the rolling shutter method, the pixels constituting the image sensor 121 are partially and sequentially exposed and generally applied to a CMOS. For example, if the image sensor 121, exposure and shielding of which are controlled through the rolling shutter method, includes m×n pixels, n pixels arranged horizontally construct one horizontal line and m horizontal lines are provided. In case of the camera 120 employing the rolling shutter method, the image processing unit 122 may produce frames of a moving picture (or a video) by synchronizing signals output from the horizontal lines.

Figure 7:
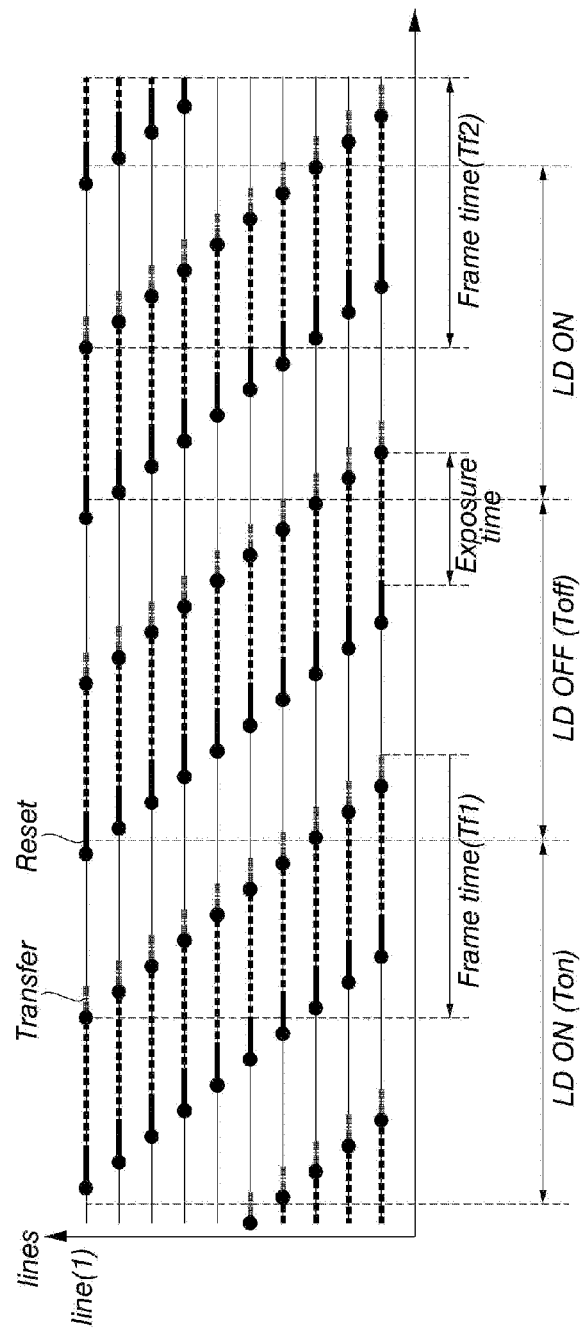
FIG. 7 is view illustrating exposure timing of horizontal lines constituting an image sensor.

In the rolling shutter method, m horizontal lines are controlled so as to be sequentially exposed. FIG. 7 is view illustrating exposure timing of the respective horizontal lines. Each horizontal line passes through a process of resetting pixels constituting the horizontal line, a process of executing exposure of the pixels for a designated exposure time, and a process of transferring voltage, output from the pixels according to accumulated charges, to the image processing unit 122. For reference, in FIG. 7, a frame time is a time starting from transfer of voltage output from the first horizontal line line(1) to completion of transfer of voltage from the final horizontal line.

The image processing unit 122 generates a digital image based on an analog signal output from the image sensor 121. The image processing unit 122 may include an A/D converter to convert the analog signal into a the digital signal, a buffer memory to temporarily record digital data according to the digital signal output from the A/D converter, and a digital signal processor (DSP) to generate a digital image by processing the data recorded in the buffer memory.

A storage unit 160 stores various pieces of information required to control the robot cleaner 100 and may include a volatile or non-volatile recording medium. The recording medium stores only data which may be read by a microprocessor, and may include a hard disk drive (HDD), a solid state disk (SSD), a silicon disk drive (SDD), a ROM, a RAM, a CD-ROM, a magnetic tape, a floppy disk, or an optical data storage device.

An image produced by the image processing unit 122 may be recorded in the storage unit 160 and a controller 140 may detect obstacle conditions around the robot cleaner 100 based on image information stored in the storage unit 160. For example, if an obstacle is present in front of the robot cleaner 100 (particularly, within an irradiation range of patterned light), patterned light irradiated from the light irradiation unit 150 to the surface of the obstacle is displayed at a different position in an image from the position of patterned light irradiated to the floor.

Figure 6:
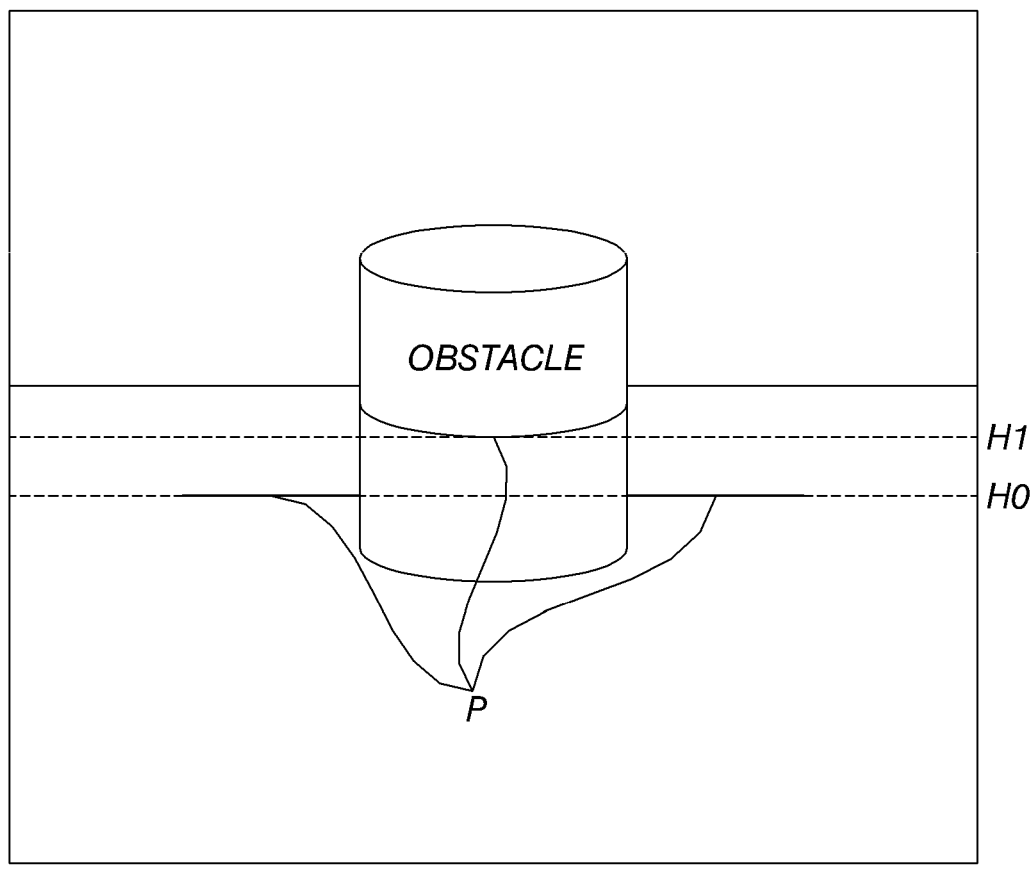
FIG. 6 is a view illustrating an image captured by a camera.

As exemplarily shown in FIG. 6, patterned light of a horizontal line P is irradiated to the floor and displayed at a height H0 in an image under the condition that no obstacle is present, and is displayed at a height H1 higher than the height H0 in the image if an obstacle is present. Based on change of the position (or change of the shape) of the pattern displayed in the image, the controller 140 may detect obstacle conditions within an area, an image of which is captured.

The signal to noise ratio SNR may be defined as follows.

$$SNR = \frac{\mu_{sig}}{\sigma_{sig}}$$

Here, $\mu_{sig}$ indicates a mean signal value and $\sigma_{sig}$ indicates a standard deviation of signal.

If output of laser light is raised to improve the SNR, a possibility that user's eyes will be exposed to high output laser light increases, thus lowering user safety and increasing power consumption. Therefore, hereinafter, if exposure of the image sensor 121 is controlled through the rolling shutter method, a method of satisfying both SNR and user safety by optimizing output timing of laser light without adjustment of output of the laser light will be proposed.

Figure 8:
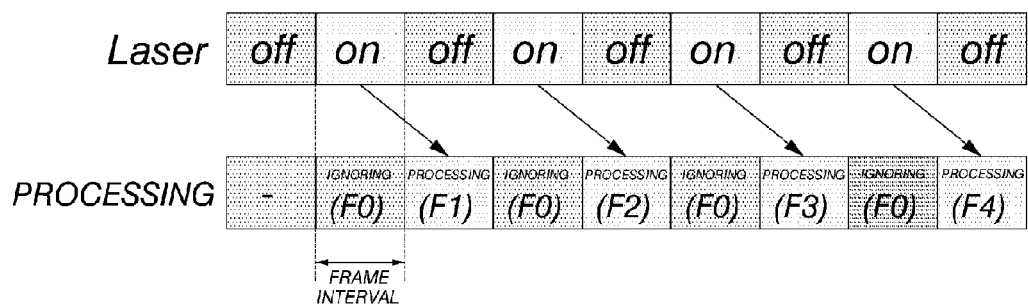
FIG. 8 is a schematic view illustrating a process of forming frames by an image processing unit, when laser light is output according to the output timing shown in FIG. 7.

FIG. 7 is view illustrating exposure timing of horizontal lines constituting the image sensor, and FIG. 8 is a schematic view illustrating a process of forming frames through the image processing unit 122, when laser light is output according to the output timing shown in FIG. 7.

With reference to FIG. 7, under control of the controller 140, the image processing unit 122 constructs frames by synchronizing signals output from horizontal lines constituting the image sensor 121. After construction of any one frame, the image processing unit 122 does not construct one or more frames by ignoring signals output from the horizontal lines, and then constructs the next frame. Here, the controller 140 controls the light irradiation unit 150 to irradiate light while the horizontal lines are exposed to construct the one frame, such that the light irradiation unit 150 stops irradiation of light between before exposure of all the horizontal lines to construct the one frame is completed and one point of time while the image processing unit 122 ignores signals output from the horizontal lines.

If output of laser light is controlled with the above timing, respective frames constructing a final image output from the image processing unit 122 consist of respective horizontal lines which are at least for an instant exposed during irradiation of light by the light irradiation unit 150 and, thus, the respective frames may assure the SNR.

Although the embodiment illustrates that output of the light irradiation unit 150 is stopped before exposure of all the horizontal lines constructing the one frame is completed, the disclosure is not limited thereto and output of the light irradiation unit 150 may be stopped at one point of time while exposure of the horizontal lines is executed again after exposure of all the horizontal lines constructing the one frame has been completed.

In control of output of the light irradiation unit 150 in such a manner, since laser light is not output always but on and off of the light irradiation unit 150 are repeated while photographing using the camera 120 is carried out, the total amount of energy consumed to output laser light may be reduced and user safety may be assured.

When, during exposure of the image sensor 121 of the camera 120, laser light is not output always but on and off of the light irradiation unit 150 are repeated, if frames are constructed by processing all signals output from the image sensor 121, an image acquired during turning-off of the light irradiation unit 150 does not display the pattern P and flickering of the pattern P in the image is generated. A frame not displaying the pattern P is not required and thus needs to be removed.

In consideration of such necessity, with reference to FIGS. 7 and 8, the image processing unit 122 constructs frames by synchronizing signals output from horizontal lines constituting the image sensor 121. Here, after construction of a first frame F1, the image processing unit 122 does not construct one or more frames F0 by ignoring signals output from the horizontal lines, and then constructs a second frame F2. Therefore, an image generated by the image processing unit 122 includes the first frame F1 and the second frame F2, and the discarded frame F0 between the first frame F1 and the second frame F2 is ignored even if signals output from the pixels are input.

An output time Ton for which laser light is output is the frame time (or the exposure time of each horizontal line) or above but may be set within the range of two times the frame time (or the exposure time of each horizontal line). For example, if the exposure time of each horizontal line is 1/30 seconds (i.e., if the frequency of reset of each horizontal line is 30 times per second), the output time Ton may be set to be 1/30 seconds or above and below 2/30 seconds. Output of laser light through the light irradiation unit 150 may be finished after reset of the first horizontal line line(1) is started to execute next exposure.

Figure 9:
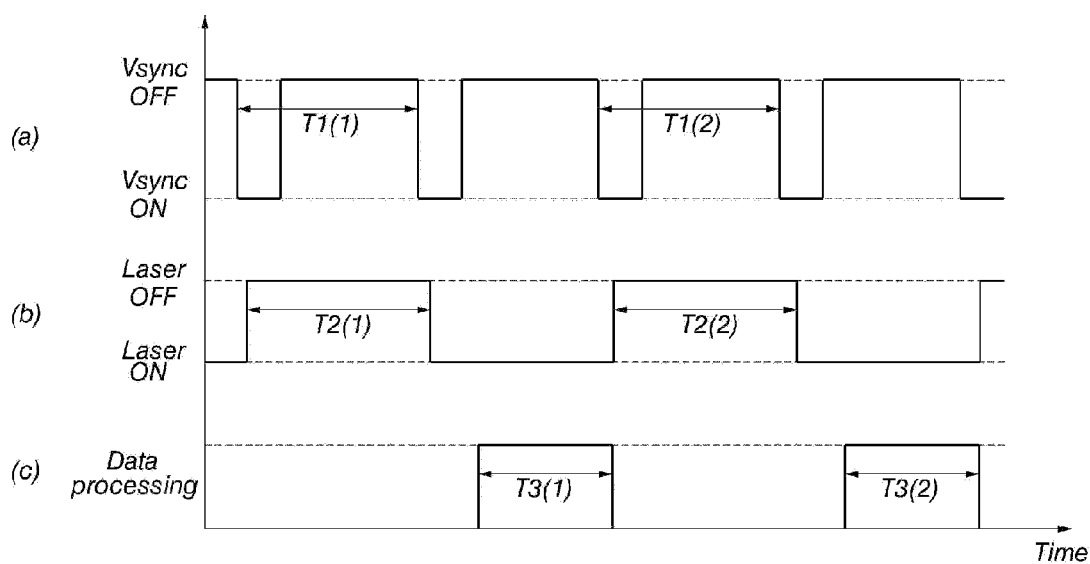
FIG. 9 shows graphs illustrating output of a vertical synchronization signal Vsync as shown in (a), irradiation of laser light as shown in (b), and data processing timing to construct frames as shown in (c), in accordance with one embodiment of the present disclosure.

FIG. 9(a) is a graph illustrating output of a vertical synchronization signal Vsync, FIG. 9(b) is a graph illustrating irradiation of laser light, and FIG. 9(c) is a graph illustrating data processing timing to construct frames, in accordance with one embodiment of the present disclosure.

With reference to FIGS. 9(a) to 9(c), in order to construct frames, the robot cleaner 100 may include a vertical synchronization signal generator 123 to output a vertical synchronization signal Vsync with respect to signals output from the plural horizontal lines. With reference to FIGS. 9(a) to 9(c), the controller 140 may control the light irradiation unit 150 to start output of laser light in response to the vertical synchronization signal Vsync.

The vertical synchronization signal Vsync may be output before reset of the first horizontal line line(1) (with reference to FIG. 7) constituting one frame is started, and FIGS. 9(a) to 9(c) illustrates that the light irradiation unit 150 starts output of laser light in response to the vertical synchronization signal Vsync. In FIGS. 9(a) to 9(c), time period T1 represents the output period of the vertical synchronization signal Vsync and substantially corresponds to the reset period of the horizontal line (for example, line(1)) of FIG. 7.

Further, time period T2 represents the output time of laser light. As is known from FIGS. 9(a) to 9(c), when the next vertical synchronization signal Vsync is output after start of output of the laser light according to the synchronization signal Vsync, output of laser light may be finished in response to output of the next vertical synchronization signal Vsync. In this case, the output time T2 of laser light is substantially the same as the output period T1 of the vertical synchronization signal Vsync.

In FIGS. 9(a) to 9(c), the light irradiation unit 150 starts output of laser light according to the first vertical synchronization signal Vsync, maintains output of laser light for a set time T2(1), and stops output of laser light according to the next vertical synchronization signal Vsync (T1(1) and T2(2) represent respective periods for which the vertical synchronization signals are generated). Then, the light irradiation unit 150 outputs laser light again according to a vertical synchronization signal generated after stoppage of output of laser light. The output time of laser light is indicated by T2(2).

Further, T3(1) and T3(2) represents times for which pieces of data to generate frames constituting an image are processed by the image processing unit 122. An image formed by light, output from the light irradiation unit 150 for T2(1), is generated for T3(1) and an image formed by light, output from the light irradiation unit 150 for T2(2), is generated for T3(2).

The camera 120 in which an image of a greater frame rate than the frame rate of an image processed by the controller 140 to sense an obstacle (i.e., the frame rate of an image finally produced by the image processing unit 122) may be produced. For example, the camera 120 may generate a moving picture consisting of 30 frames per second (30 fps, i.e., the frequency of reset of the horizontal line being 30 times per second), when there is no frame ignored by the image processing unit 122. In this case, the image processing unit 122 generates one frame per 3 operating periods of the rolling shutter (with reference to the processed frames in FIG. 8), outputs the frame to the controller 140, and ignores information corresponding to the remaining two frames (with reference to the ignored frames in FIG. 8), thus finally generating an image of 10 fps.

As apparent from the above description, a robot cleaner in accordance with the present disclosure may properly control output timing of light from a light irradiation unit in consideration of operating characteristics of a rolling shutter, thus reducing the overall output time of light from the light irradiation unit and maintaining constant SNR of an image without lowering. Even if a light irradiation unit to irradiate laser light is provided, safety to protect user's eyesight may be assured.

The present disclosure provides a robot cleaner which assures a sufficient SNR of an image acquired by photographing a region, to which laser light is irradiated, and optimizes a laser output time so as to safely protect user's eyesight.

A robot cleaner according to an exemplary embodiment of the present disclosure, may include a main body configured to clean the floor within a cleaning area while autonomously traveling, a light irradiation unit configured to irradiate light towards a region in front of the main body, an image sensor including a plurality of horizontal lines sequentially exposed to form an image of the region in front of the main body, an image processing unit configured to construct frames by synchronizing signals output from the horizontal lines, such that, after construction of any one frame, the image processing unit does not construct one or more frames by ignoring signals output from the horizontal lines, and then constructs a next frame, and a controller configured to control the light irradiation unit to irradiate light while the horizontal lines are exposed to construct the one frame, such that the light irradiation unit stops irradiation of light between before exposure of all the horizontal lines to construct the one frame is completed and one point of time while the image processing unit ignores signals output from the horizontal lines.

The controller may set irradiation timing of light by the light irradiation unit so that all of the horizontal lines are exposed at least for a designated time during irradiation of light.

The irradiation time of light by the light irradiation unit may not exceed 2 times the exposure period of the horizontal line. The irradiation time of light by the light irradiation unit may be greater than the exposure period of the horizontal line.

The controller may control the light irradiation unit to stop irradiation of light after reset of the first horizontal line of the horizontal lines is started to execute next exposure.

The robot cleaner may include a vertical synchronization signal generator configured to output a vertical synchronization signal with respect to signals output from the plurality of horizontal lines so as to construct the frames, and the controller may control irradiation of light through the light irradiation unit in response to the vertical synchronization signal. The controller may control the light irradiation unit to irradiate light according to the vertical synchronization signal and then control the light irradiation unit to stop irradiation of light according to a next vertical synchronization signal.

The frequency of reset of the horizontal line may be greater than the frame rate of an image produced by the image processing unit. The frequency of reset of the horizontal line may be two times or more the frame rate of the image.

The plurality of horizontal lines may be sequentially exposed by a designated time interval and the exposure times of the respective horizontal lines may be the same.

Among the plurality of horizontal lines, exposure of the first horizontal line may be started before exposure of the final horizontal line is completed.

The light irradiation unit may irradiate laser light.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner comprising:
    a main body configured to clean a floor while autonomously traveling within a cleaning area;
    a light irradiation module configured to irradiate light towards a region in front of the main body;
    an image sensor including a plurality of horizontal lines sequentially exposed to form an image of the region in front of the main body;
    an image processor configured to construct frames by synchronizing signals output from the horizontal lines, such that after construction of any one frame, the image processor does not construct one or more frames by ignoring signals output from the horizontal lines, and then constructs a next frame; and
    a controller configured to control the light irradiation module to irradiate light while the horizontal lines are exposed to construct the one frame, such that the light irradiation module stops irradiation of light between before exposure of all the horizontal lines to construct the one frame is completed and one point of time while the image processor ignores signals output from the horizontal lines.

2. The robot cleaner according to claim 1, wherein the controller sets irradiation timing of light by the light irradiation module so that all of the horizontal lines are exposed at least for a designated time during irradiation of light.

3. The robot cleaner according to claim 1, wherein the irradiation time of light by the light irradiation module does not exceed 2 times the exposure period of the horizontal line.

4. The robot cleaner according to claim 3, wherein the irradiation time of light by the light irradiation module is greater than the exposure period of the horizontal line.

5. The robot cleaner according to claim 1, wherein the controller controls the light irradiation module to stop irradiation of light after reset of the first horizontal line of the horizontal lines is started to execute next exposure.

6. The robot cleaner according to claim 1, further comprising a vertical synchronization signal generator configured to output a vertical synchronization signal with respect to signals output from the plurality of horizontal lines so as to construct the frames,
wherein the controller controls irradiation of light through the light irradiation module in response to the vertical synchronization signal.

7. The robot cleaner according to claim 6, wherein the controller controls the light irradiation module to irradiate light according to the vertical synchronization signal and then controls the light irradiation module to stop irradiation of light according to a next vertical synchronization signal.

8. The robot cleaner according to claim 1, wherein the frequency of reset of the horizontal line is greater than the frame rate of an image produced by the image processor.

9. The robot cleaner according to claim 8, wherein the frequency of reset of the horizontal line is two times or more the frame rate of the image.

10. The robot cleaner according to claim 1, wherein the plurality of horizontal lines is sequentially exposed by a designated time interval and the exposure times of the respective horizontal lines are the same.

11. The robot cleaner according to claim 1, wherein among the plurality of horizontal lines, exposure of the first horizontal line is started before exposure of the final horizontal line is completed.

12. The robot cleaner according to claim 1, wherein the light irradiation module irradiates laser light.

13. A vacuum cleaner comprising:
a main body including at least one motor to suction air through a suction hole provided with a roller brush and to allow the main body to move autonomously for cleaning a floor surface within an area to be cleaned;
a laser to irradiate light towards a region in front of the main body;
a camera configured to capture at least one image in front of the main body;
an image processor to process the at least one image captured by the camera;
a synchronization generator to generate a plurality of synchronization signals; and
a controller to control the motor, the laser, the camera, the image processor, and the synchronization generator, wherein
the synchronization generator generates first, second and third synchronization signals during a prescribed time period,
the camera captures images during the prescribed time period,
the laser is turned on when the first and third synchronization signals are generated and is turned off when the second synchronization signal is generated, and
the image processor processes first and second images captured by the camera when the laser is turned on based on the first and third synchronization signals and discards a third image captured by the camera when the laser is turned off based on the second synchronization signal.

14. The vacuum cleaner of claim 13, wherein the second synchronization signal is generated between the first and third synchronization signals.

15. The vacuum cleaner of claim 13, wherein the image processor process the at least one image captured by the camera during a time period when the laser is turned off.

16. The vacuum cleaner of claim 13, wherein the first, second and third synchronization signals have equal time length during the prescribed time period.

17. The vacuum cleaner of claim 13, wherein the laser is turned on for at least $1/30$ seconds and no greater than $2/30$ seconds.

* * * * *